(12) United States Patent
Dolberg et al.

(10) Patent No.: US 12,115,821 B2
(45) Date of Patent: Oct. 15, 2024

(54) TIRE PRESSURE MONITORING SYSTEM EMPLOYING AXLE CROSS COMPARISON

(71) Applicant: The Goodyear Tire & Rubber Company, Akrom, OH (US)

(72) Inventors: Lautaro Dolberg, Luxembourg (LU); Kanwar Bharat Singh, Bofferdange (LU)

(73) Assignee: The Goodyear Tire & Rubber Company, Akron, OH (US)

( * ) Notice: Subject to any disclaimer, the term of this patent is extended or adjusted under 35 U.S.C. 154(b) by 0 days.

(21) Appl. No.: 17/809,930

(22) Filed: Jun. 30, 2022

(65) Prior Publication Data

US 2023/0001752 A1    Jan. 5, 2023

Related U.S. Application Data

(60) Provisional application No. 63/217,837, filed on Jul. 2, 2021.

(51) Int. Cl.
*B60C 23/04* (2006.01)

(52) U.S. Cl.
CPC ...... *B60C 23/0479* (2013.01); *B60C 23/0415* (2013.01); *B60C 23/0474* (2013.01)

(58) Field of Classification Search
CPC ............ B60C 23/0479; B60C 23/0415; B60C 23/0474; B60C 23/0477
USPC ....................................................... 340/442
See application file for complete search history.

(56) References Cited

U.S. PATENT DOCUMENTS

| | | | |
|---|---|---|---|
| 4,064,482 | A | 12/1977 | Maisch et al. |
| 6,002,327 | A | 12/1999 | Boesch et al. |
| 6,222,444 | B1 | 4/2001 | Wang |
| 6,246,317 | B1 | 6/2001 | Pickornik et al. |
| 6,278,363 | B1 | 8/2001 | Bezek et al. |
| 6,404,330 | B1 | 6/2002 | Sugisawa |
| 6,581,449 | B1 | 6/2003 | Brown et al. |
| 6,584,427 | B2 | 6/2003 | Kamiya et al. |

(Continued)

FOREIGN PATENT DOCUMENTS

| | | |
|---|---|---|
| EP | 0751019 A1 | 1/1997 |
| EP | 1270275 A2 | 1/2003 |

(Continued)

OTHER PUBLICATIONS

Search Report issued in corresponding European application.

*Primary Examiner* — Eric Blount
(74) *Attorney, Agent, or Firm* — Edward T. Kennedy

(57) ABSTRACT

A tire pressure monitoring system includes a first tire mounted on a first end of an axle and a second tire mounted on a second end of the axle. A first sensor is mounted on the first tire for measuring a pressure, and a second sensor is mounted on the second tire for measuring a pressure. The system includes means for transmitting measured pressure data from the first sensor and the second sensor to a processor. A tire pressure model is executed on the processor, and includes an aggregator that accumulates the measured pressure data from the first sensor and the second sensor. A noise filter filters sensor noise and generates filtered pressure data from the measured tire pressure data. A detection module receives the filtered pressure data and determines when a leak occurs in one of the tires. A leak notification is generated when the leak occurs.

19 Claims, 9 Drawing Sheets

(56) References Cited

U.S. PATENT DOCUMENTS

| | | | |
|---|---|---|---|
| 6,668,637 B2 | 12/2003 | Ono et al. | |
| 6,691,059 B1 | 2/2004 | Griesser | |
| 6,705,157 B2 | 3/2004 | Fischer et al. | |
| 6,748,799 B2 | 6/2004 | Fischer et al. | |
| 6,822,561 B2 | 11/2004 | Latarnik et al. | |
| 6,838,983 B1 | 1/2005 | Wong | |
| 6,860,146 B2 | 3/2005 | Dufournier | |
| 6,868,358 B2 | 3/2005 | Brown, Jr. | |
| 6,907,776 B2 | 6/2005 | Fischer et al. | |
| 6,956,471 B2 | 10/2005 | Tamimi et al. | |
| 6,966,220 B2 | 11/2005 | Yueh | |
| 6,993,449 B2 | 1/2006 | Koebe et al. | |
| 7,004,019 B2 | 2/2006 | Fischer et al. | |
| 7,013,721 B2 | 3/2006 | Keller et al. | |
| 7,069,134 B2 | 6/2006 | Williams | |
| 7,146,852 B2 | 12/2006 | Suzuki | |
| 7,181,366 B2 | 2/2007 | Rimkus et al. | |
| 7,187,273 B2 * | 3/2007 | Rieck | B60C 23/061 701/32.7 |
| 7,209,855 B2 | 4/2007 | Fabre et al. | |
| 7,242,285 B2 | 7/2007 | Shaw | |
| 7,263,458 B2 | 8/2007 | Gustavsson et al. | |
| 7,301,444 B2 | 11/2007 | Matsuura | |
| 7,321,840 B2 | 1/2008 | Abramovitch | |
| 7,323,975 B2 | 1/2008 | Hall et al. | |
| 7,388,478 B2 | 6/2008 | Watabe | |
| 7,432,801 B2 | 10/2008 | Verrier et al. | |
| 7,434,455 B2 | 10/2008 | Alff | |
| 7,437,922 B2 | 10/2008 | Bougeard et al. | |
| 7,513,145 B2 | 4/2009 | Katou et al. | |
| 7,515,039 B2 | 4/2009 | Casey et al. | |
| 7,518,495 B2 | 4/2009 | Tang et al. | |
| 7,528,705 B2 | 5/2009 | Brown, Jr. et al. | |
| 7,594,433 B2 | 9/2009 | Bondu | |
| 7,817,023 B2 | 10/2010 | Shimura | |
| 8,279,054 B2 | 10/2012 | Kuchler et al. | |
| 8,373,552 B2 | 2/2013 | Liberge | |
| 8,489,274 B2 | 7/2013 | Boehme et al. | |
| 8,514,062 B2 | 8/2013 | Patel et al. | |
| 8,565,959 B2 | 10/2013 | Brown, Jr. | |
| 8,833,151 B2 | 9/2014 | Tebano et al. | |
| 9,057,661 B2 | 6/2015 | Keller | |
| 9,079,461 B2 * | 7/2015 | Suh | B60C 23/0479 |
| 9,091,537 B2 | 7/2015 | Farr et al. | |
| 9,120,357 B2 | 9/2015 | Deniau et al. | |
| 9,134,194 B2 | 9/2015 | Wada | |
| 9,145,033 B2 | 9/2015 | Hall et al. | |
| 9,162,541 B2 | 10/2015 | Reynes | |
| 9,248,707 B2 | 2/2016 | Zhou et al. | |
| 9,261,432 B2 | 2/2016 | Dudar | |
| 9,296,267 B2 | 3/2016 | Mcintyre et al. | |
| 9,387,732 B1 | 7/2016 | Gunawan | |
| 9,418,492 B2 | 8/2016 | Sinner et al. | |
| 9,446,634 B2 | 9/2016 | Wagner et al. | |
| 9,446,635 B2 | 9/2016 | Wagner et al. | |
| 9,487,054 B2 | 11/2016 | Mcintyre et al. | |
| 9,505,502 B2 | 11/2016 | Miller | |
| 9,528,899 B2 | 12/2016 | Wada | |
| 9,561,695 B2 | 2/2017 | Horikoshi et al. | |
| 9,636,956 B2 | 5/2017 | Xu | |
| 9,694,630 B2 | 7/2017 | Kona | |
| 9,694,811 B1 | 7/2017 | Lai | |
| 9,802,447 B2 | 10/2017 | Petrucelli | |
| 9,895,943 B2 | 2/2018 | Bill | |
| 9,925,837 B2 | 3/2018 | Peine et al. | |
| 9,970,839 B2 | 5/2018 | Yanase | |
| 10,035,387 B2 | 7/2018 | Carresjö et al. | |
| 10,150,339 B2 * | 12/2018 | Zaroor | B60C 23/0474 |
| 10,166,823 B2 | 1/2019 | Sugiyama | |
| 10,183,534 B2 * | 1/2019 | Bill | G01K 13/00 |
| 10,189,319 B2 | 1/2019 | Fu | |
| 10,252,584 B2 | 4/2019 | Juzswik | |
| 10,286,738 B2 | 5/2019 | Taki | |
| 10,350,949 B2 | 7/2019 | Surendra | |
| 10,391,823 B2 | 8/2019 | Steinmeyer et al. | |
| 10,442,256 B2 | 10/2019 | Baum et al. | |
| 10,442,257 B2 | 10/2019 | Abdossalami et al. | |
| 10,543,721 B2 | 1/2020 | Choi | |
| 10,696,108 B1 | 6/2020 | Alghooneh et al. | |
| 10,933,705 B2 | 3/2021 | Ga et al. | |
| 2002/0130771 A1 | 9/2002 | Osborne et al. | |
| 2005/0033549 A1 | 2/2005 | Clark | |
| 2005/0072223 A1 | 4/2005 | Fennel et al. | |
| 2007/0186634 A1 | 8/2007 | Burghardt et al. | |
| 2009/0128315 A1 | 5/2009 | Griesser et al. | |
| 2011/0257829 A1 | 10/2011 | Polzin | |
| 2012/0029759 A1 | 2/2012 | Suh et al. | |
| 2012/0191495 A1 | 7/2012 | Mcintosh et al. | |
| 2013/0282233 A1 * | 10/2013 | Hsia | B60C 23/0457 701/36 |
| 2014/0039752 A1 | 2/2014 | Juzswik | |
| 2014/0277910 A1 * | 9/2014 | Suh | B60C 23/0476 701/33.9 |
| 2015/0012170 A1 | 1/2015 | Pita-gil et al. | |
| 2016/0311273 A1 * | 10/2016 | Zaroor | B60C 23/0474 |
| 2016/0361958 A1 * | 12/2016 | Steiner | B60C 23/04 |
| 2017/0200326 A1 | 7/2017 | Liu et al. | |
| 2018/0207999 A1 | 7/2018 | Dunning et al. | |
| 2019/0023089 A1 * | 1/2019 | Abdossalami | G01M 3/26 |
| 2019/0375254 A1 | 12/2019 | Steiner et al. | |
| 2019/0382034 A1 | 12/2019 | Miller et al. | |
| 2020/0070596 A1 | 3/2020 | Muhlhoff et al. | |
| 2020/0134942 A1 * | 4/2020 | Root | B60C 23/131 |
| 2020/0189327 A1 * | 6/2020 | Kintscher | B60C 23/0401 |
| 2021/0407226 A1 * | 12/2021 | Zhang | G06Q 10/20 |

FOREIGN PATENT DOCUMENTS

| | | |
|---|---|---|
| EP | 2142390 B1 | 1/2015 |
| EP | 2676818 B1 | 1/2015 |
| EP | 2995475 A1 | 3/2016 |
| EP | 3560736 A1 | 10/2019 |
| JP | 2012233846 A | 11/2012 |
| WO | 2008113376 A1 | 9/2008 |
| WO | 2009036547 A1 | 3/2009 |
| WO | 2009113110 A1 | 9/2009 |
| WO | 2015106907 A1 | 7/2015 |
| WO | 2019092352 A1 | 5/2019 |
| WO | 2020128938 A1 | 6/2020 |

* cited by examiner

TIRE PRESSURE MONITORING SYSTEM EMPLOYING AXLE CROSS COMPARISON

FIELD OF THE INVENTION

The invention relates generally to tire monitoring systems. More particularly, the invention relates to systems that monitor conditions in a tire, such as tire pressure. Specifically, the invention is directed to a system that determines if a tire pressure leak is present by monitoring 9a pressure difference across two tires mounted on an axle.

BACKGROUND OF THE INVENTION

Vehicles include two or more axles that are supported by pneumatic tires. Typically, at least one tire is mounted on each end of each axle. Such tires typically have certain conditions or parameters that are beneficial to monitor during vehicle operation. For example, monitoring the pressure of a pneumatic tire may be helpful in assessing the condition and/or performance of the tire, as a low pressure may indicate that there is an issue with the tire.

To monitor tire pressure, Tire Pressure Monitoring Systems (TPMS) have been developed. Tire Pressure Monitoring Systems measure the pressure inside the tire cavity using sensors that are attached to the tire, and obtain pressure data in real time from the sensors.

The measured tire pressure may be correlated to a specific tire and transmitted to an electronic control system of the vehicle. The measured tire pressure data may then be employed to improve the function of vehicle systems, such as an anti-lock brake system (ABS), electronic stability control system (ECS), and the like. The measured tire pressure data may also be sent to an operator of the vehicle.

In addition, for fleets of commercial vehicles or passenger vehicles, it is desirable for a manager of the fleet to be informed of tire pressure to make informed decisions about the tires and the vehicle. For example, in the event that a pressure measurement is below a threshold value, an alert may be sent to the fleet manager. The fleet manager may then instruct the vehicle operator to reduce the vehicle speed or direct the vehicle to a service center.

It is desirable to improve the accuracy of TPMS measurements, particularly for slow pressure leaks that occur gradually over time. However, in many cases, tire pressure is the only parameter that can be measured in certain TPMS systems, which makes it difficult for the systems to account for and/or compensate for various driving conditions and temperature conditions.

In addition, prior art techniques typically only compare a measured pressure or a temperature compensated pressure to a threshold value and transmit an alert when the measured or compensated pressure drops below the threshold value. Such techniques lack precision, as they may generate an alert that is not needed. Prior art techniques also do not distinguish between a rapid leak condition and a slow leak condition. Detection of a slow leak detection is particularly advantageous for fleet managers, as preventive measures for the tire may be taken according to a fleet maintenance schedule, rather than unnecessarily removing the vehicle from immediate service.

As a result, there is a need in the art for a system that determines with precision if an air pressure leak is present when tire pressure is the only parameter that can be measured.

SUMMARY OF THE INVENTION

According to an aspect of an exemplary embodiment of the invention, a tire pressuring monitoring system is provided. The system includes a first tire mounted on a first end of an axle and a second tire mounted on a second end of the axle, in which the first and second tires and the axle support a vehicle. A first sensor is mounted on the first tire for measuring a pressure of the first tire, and a second sensor is mounted on the second tire for measuring a pressure of the second tire. The system includes means for transmitting measured pressure data from the first sensor and the second sensor to a processor. A tire pressure model is executed on the processor and includes an aggregator that accumulates the measured pressure data from the first sensor and the second sensor. A noise filter filters sensor noise and generates filtered pressure data from the measured tire pressure data. A detection module receives the filtered pressure data and determines when an air pressure leak occurs in at least one of the first tire and the second tire. A leak notification is generated by the tire pressure model when the air pressure leak occurs.

BRIEF DESCRIPTION OF THE DRAWINGS

The invention will be described by way of example and with reference to the accompanying drawings, in which.

Similar numerals refer to similar parts throughout the drawings.

Definitions

"ANN" or "Artificial Neural Network" is an adaptive tool for non-linear statistical data modeling that changes its structure based on external or internal information that flows through a network during a learning phase. ANN neural networks are non-linear statistical data modeling tools used to model complex relationships between inputs and outputs or to find patterns in data.

"Axial" and "axially" means lines or directions that are parallel to the axis of rotation of the tire.

"CAN bus" is an abbreviation for controller area network.

"Circumferential" means lines or directions extending along the perimeter of the surface of the annular tread perpendicular to the axial direction.

"Equatorial centerplane (CP)" means the plane perpendicular to the tire's axis of rotation and passing through the center of the tread.

"Footprint" means the contact patch or area of contact created by the tire tread with a flat surface as the tire rotates or rolls.

"Inboard side" means the side of the tire nearest the vehicle when the tire is mounted on a wheel and the wheel is mounted on the vehicle.

"Kalman filter" is a set of mathematical equations that implement a predictor-corrector type estimator that is optimal in the sense that it minimizes the estimated error covariance when some presumed conditions are met.

"Lateral" means an axial direction.

"Luenberger observer" is a state observer or estimation model. A "state observer" is a system that provide an estimate of the internal state of a given real system, from measurements of the input and output of the real system. It is typically computer-implemented, and provides the basis of many practical applications.

"MSE" is an abbreviation for mean square error, the error between and a measured signal and an estimated signal which the Kalman filter minimizes.

"Outboard side" means the side of the tire farthest away from the vehicle when the tire is mounted on a wheel and the wheel is mounted on the vehicle.

"Radial" and "radially" means directions radially toward or away from the axis of rotation of the tire.

"Rib" means a circumferentially extending strip of rubber on the tread which is defined by at least one circumferential groove and either a second such groove or a lateral edge, the strip being laterally undivided by full-depth grooves.

"Tread element" or "traction element" means a rib or a block element defined by a shape having adjacent grooves.

DETAILED DESCRIPTION OF THE INVENTION

Figure 1:
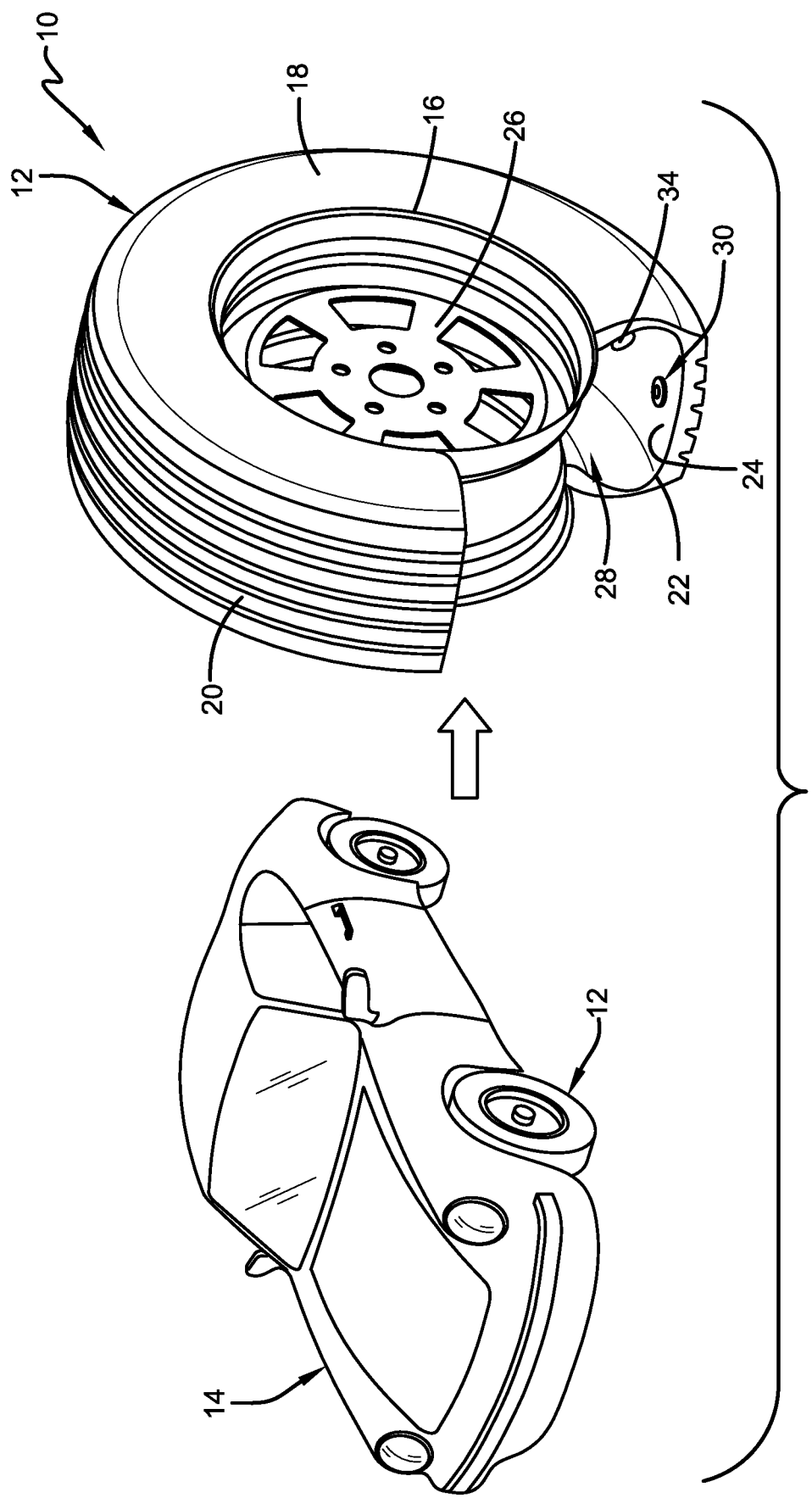
FIG. 1 is a schematic perspective view of a vehicle and tire that employ an exemplary embodiment of the tire pressure monitoring system of the present invention, showing the tire partially in section.

Turning now to FIGS. 1 through 9, an exemplary embodiment of the tire pressure monitoring system of the present invention is indicated at 10. With particular reference to FIG. 1, the system 10 monitors the pressure in each tire 12 supporting a vehicle 14. More particularly, as will be described in greater detail below, the system 10 monitors the pressure difference across two tires 12, which preferably are mounted on opposite ends of the same axle, and accumulates the differences over time. If the accumulated difference exceeds a predetermined threshold, the system 10 generates an alert that a pressure leak is present.

Figure 2:
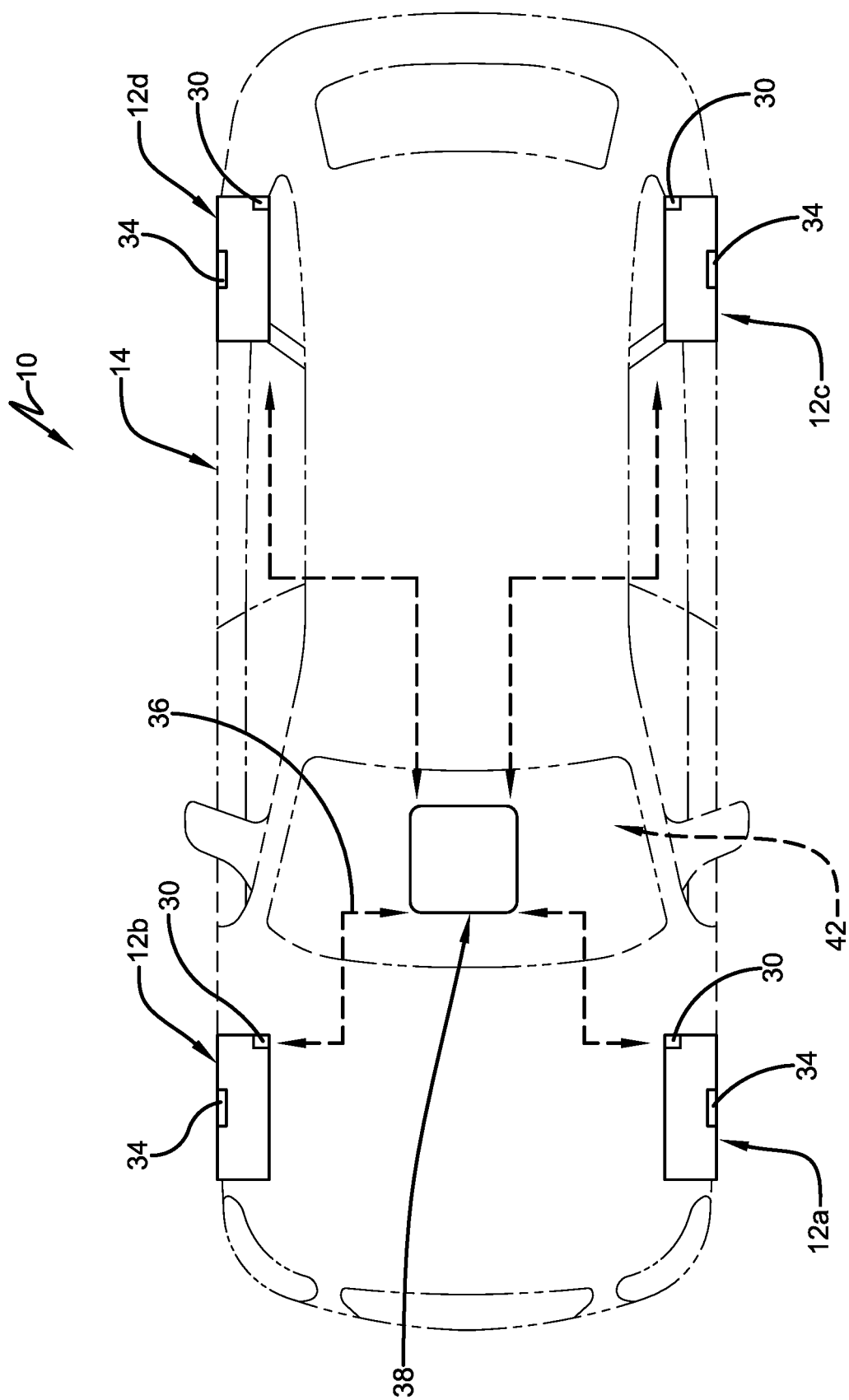
FIG. 2 is a schematic plan view of the vehicle shown in FIG. 1.

While the vehicle 14 is depicted as a passenger car, the invention is not to be so restricted. The principles of the invention find application in other vehicle categories such as commercial trucks, off-the-road vehicles, and the like, in which vehicles may be supported by more or fewer tires. In addition, the invention finds application in a single vehicle 14 or in fleets of vehicles. By way of example, the vehicle 14 is shown in FIG. 2 with four tires 12, a front left tire 12a, a front right tire 12b, a rear left tire 12c, and a rear right tire 12d.

Returning to FIG. 1, each tire 12 includes a pair of bead areas 16 (only one shown) and a bead core (not shown) embedded in each bead area. Each one of a pair of sidewalls 18 (only one shown) extends radially outward from a respective bead area 16 to a ground-contacting tread 20. The tire 12 is reinforced by a carcass 22 that toroidally extends from one bead area 16 to the other bead area, as known to those skilled in the art. An innerliner 24 is formed on the inside surface of the carcass 22. The tire 12 is mounted on a wheel 26 in a manner known to those skilled in the art and, when mounted, forms an internal cavity 28 that is filled with a pressurized fluid, such as air.

A sensor unit 30 may be attached to the innerliner 24 of each tire 12 by means such as an adhesive and measures certain parameters of the tire, as will be described in greater detail below. It is to be understood that the sensor unit 30 may be attached in such a manner, or to other components of the tire 12, such as between layers of the carcass 22, on or in one of the sidewalls 18, on or in the tread 20, and/or a combination thereof. For the purpose of convenience, reference herein shall be made to mounting of the sensor unit 30 on the tire 12, with the understanding that mounting includes all such attachment.

The sensor unit 30 is mounted on each tire 12 for the purpose of detecting certain real-time tire parameters inside the tire, such as tire pressure. Preferably the sensor unit 30 is a tire pressure monitoring system (TPMS) module or sensor, of a type that is commercially available, and may be of any known configuration. For the purpose of convenience, the sensor unit 30 shall be referred to as a TPMS sensor. Each TPMS sensor 30 may also include electronic memory capacity for storing identification (ID) information for each tire 12, known as tire ID information. Alternatively, tire ID information may be included in another sensor unit, or in a separate tire ID storage medium, such as a tire ID tag 34.

The tire ID information may include manufacturing information for each respective tire 12, such as: the tire type; tire model; size information, such as rim size, width, and outer diameter; manufacturing location; manufacturing date; a treadcap code that includes or correlates to a compound identification; and a mold code that includes or correlates to a tread structure identification. The tire ID information may also include a service history or other information to identify specific features and parameters of each tire 12, as well as mechanical characteristics of the tire, such as cornering parameters, spring rate, load-inflation relationship, and the like.

Turning now to FIG. 2, the TPMS sensor 30 and the tire ID tag 34 each include an antenna for wireless transmission 36 of the measured tire pressure, as well as tire ID data, to a processor 38. The processor 38 may be mounted on the vehicle 14 as shown, or may be integrated into the TPMS sensor 30. For the purpose of convenience, the processor 38 will be described as being mounted on the vehicle 14, with the understanding that the processor may alternatively be integrated into the TPMS sensor 30. Preferably, the processor 38 is in electronic communication with or integrated into an electronic system of the vehicle 14, such as the vehicle CAN bus system 42, which is referred to as the CAN bus.

Aspects of the tire data information system 10 preferably are executed on the processor 38 or another processor that is accessible through the vehicle CAN bus 42, which enables input of data from the TPMS sensor 30 and the tire ID tag 34, as well as input of data from other sensors that are in electronic communication with the CAN bus. In this manner, the tire pressure monitoring system 10 enables direct measurement of tire pressure with the TPMS sensor 30, which preferably is transmitted to the processor 38. Tire ID information preferably is transmitted from the TPMS sensor 30 or the tire ID tag 34 to the processor 38. The processor 38 preferably correlates the measured tire pressure, the measurement time, and ID information for each tire 12.

Figure 3:
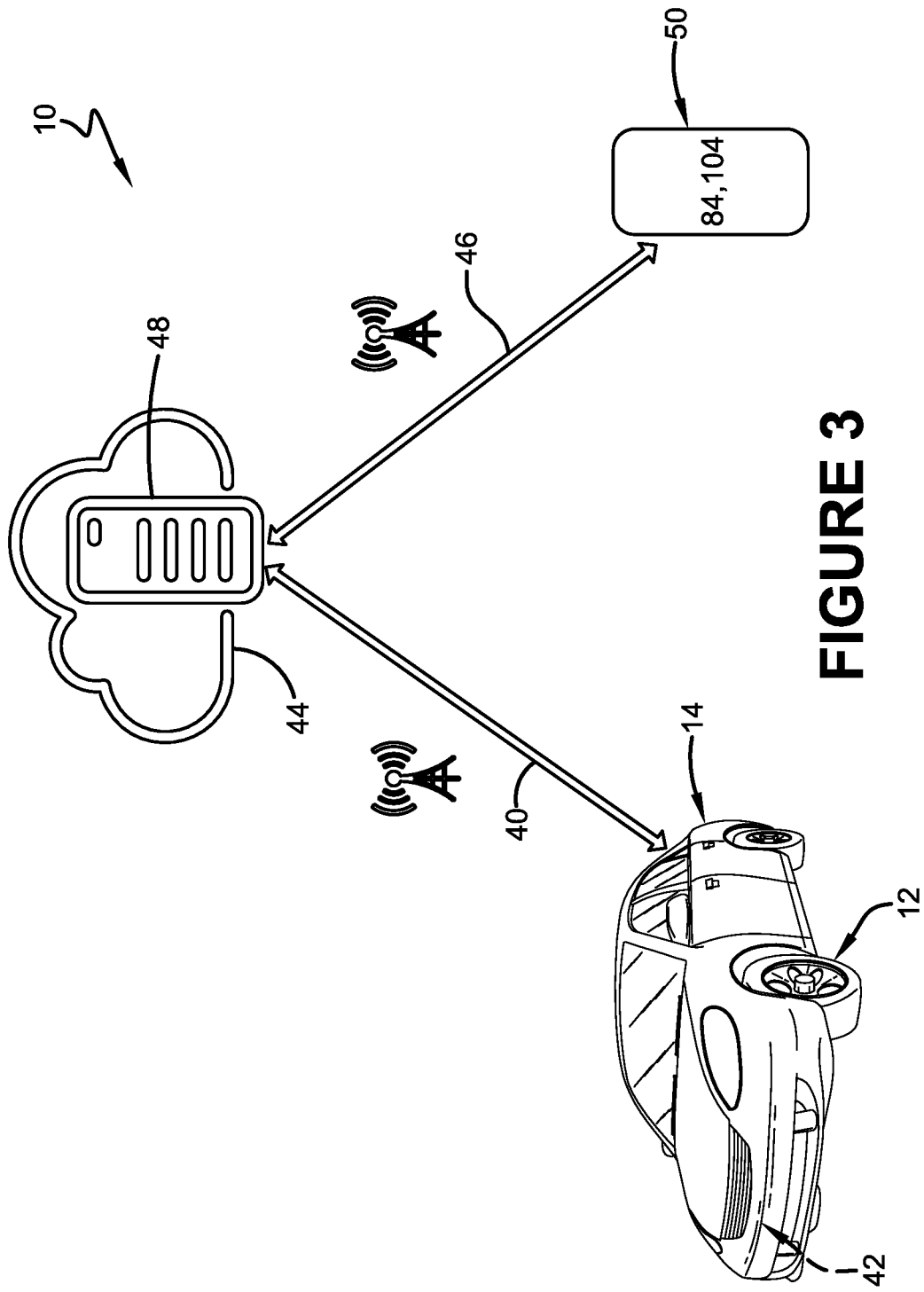
FIG. 3 is a schematic perspective view of the vehicle shown in FIG. 1 with a representation of data transmission to a cloud-based server and to a display device.

Referring to FIG. 3, when the measured tire pressure, measurement time and ID information are correlated for each tire 12, the data may be wirelessly transmitted 40 from the processor 38 (FIG. 2) and/or the CAN-bus 42 on the vehicle 14 to a remote processor 48, such as a processor in a cloud-based server 44. The cloud-based server 44 preferably executes a tire pressure model 54 of the tire pressure monitoring system 10, which will be described in greater detail below. Output from the system 10 may be wirelessly transmitted 46 to a display device 50 that is accessible to a user of the vehicle 14, such as a smartphone, or to a fleet manager.

Figure 4:
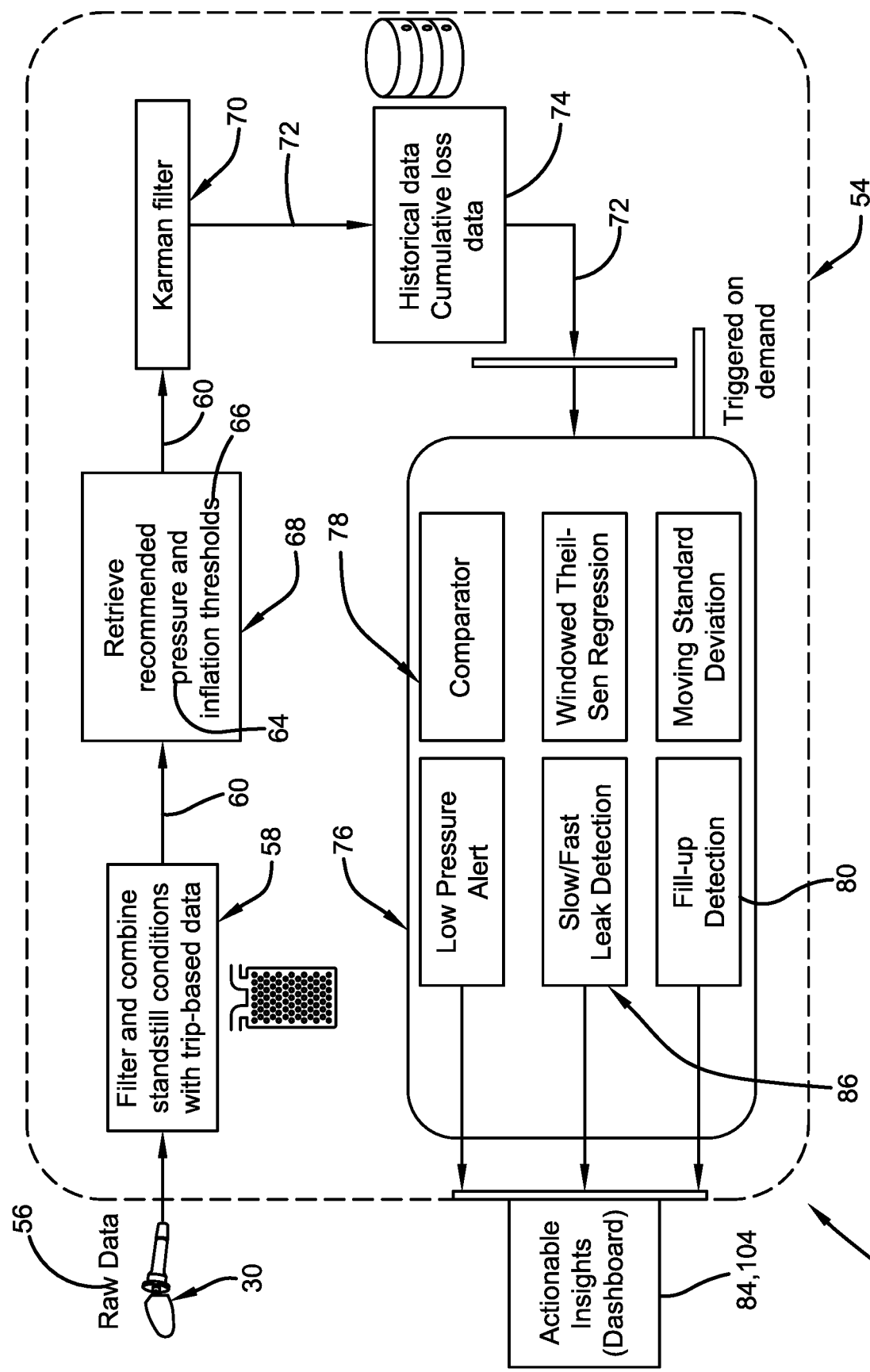
FIG. 4 is a flow diagram showing aspects of an exemplary embodiment of the tire pressure monitoring system of the present invention.
Figure 5:
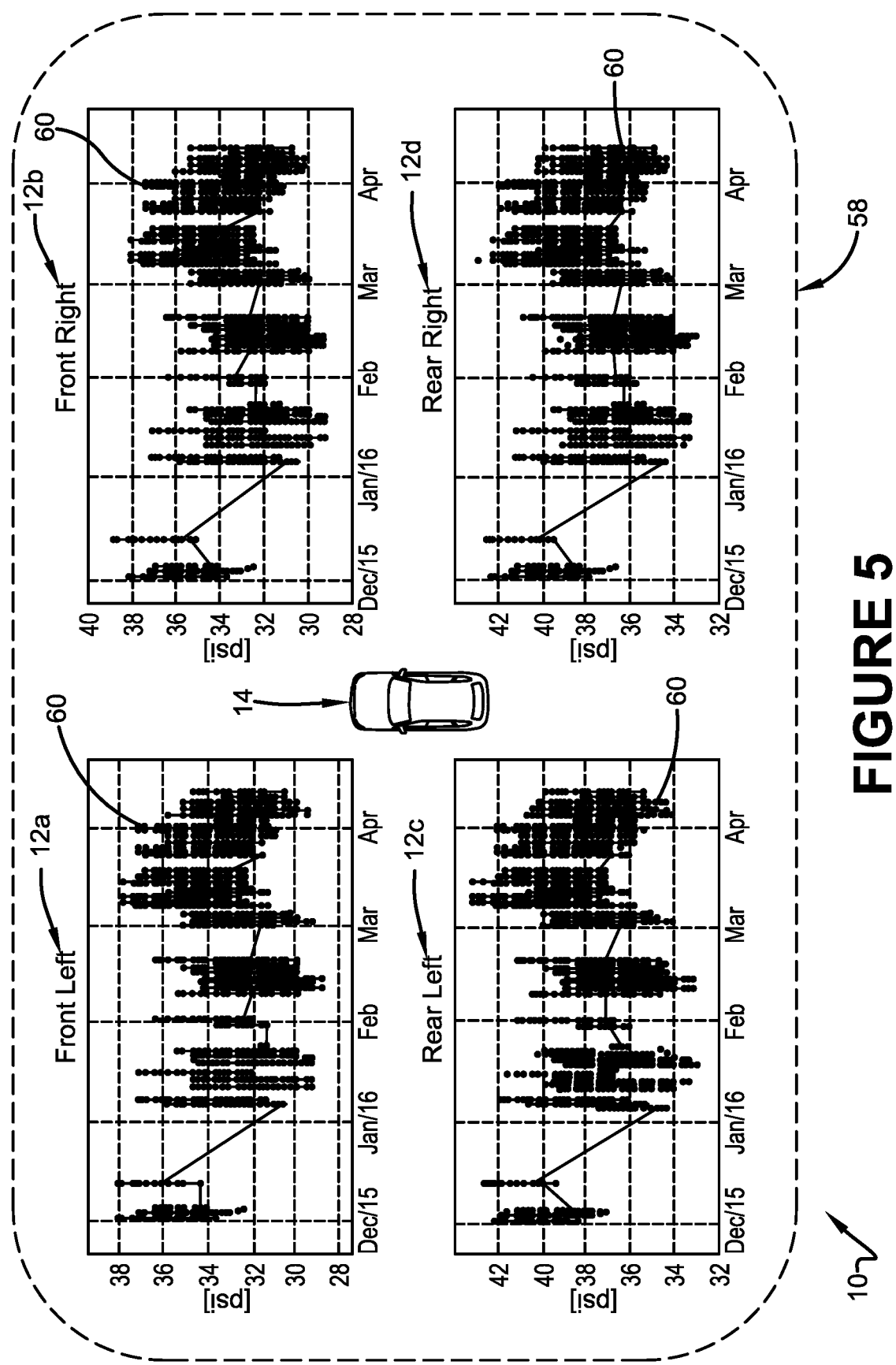
FIG. 5 is a graphical representation of an aspect of the tire pressure monitoring system shown in FIG. 4.
Figure 6:
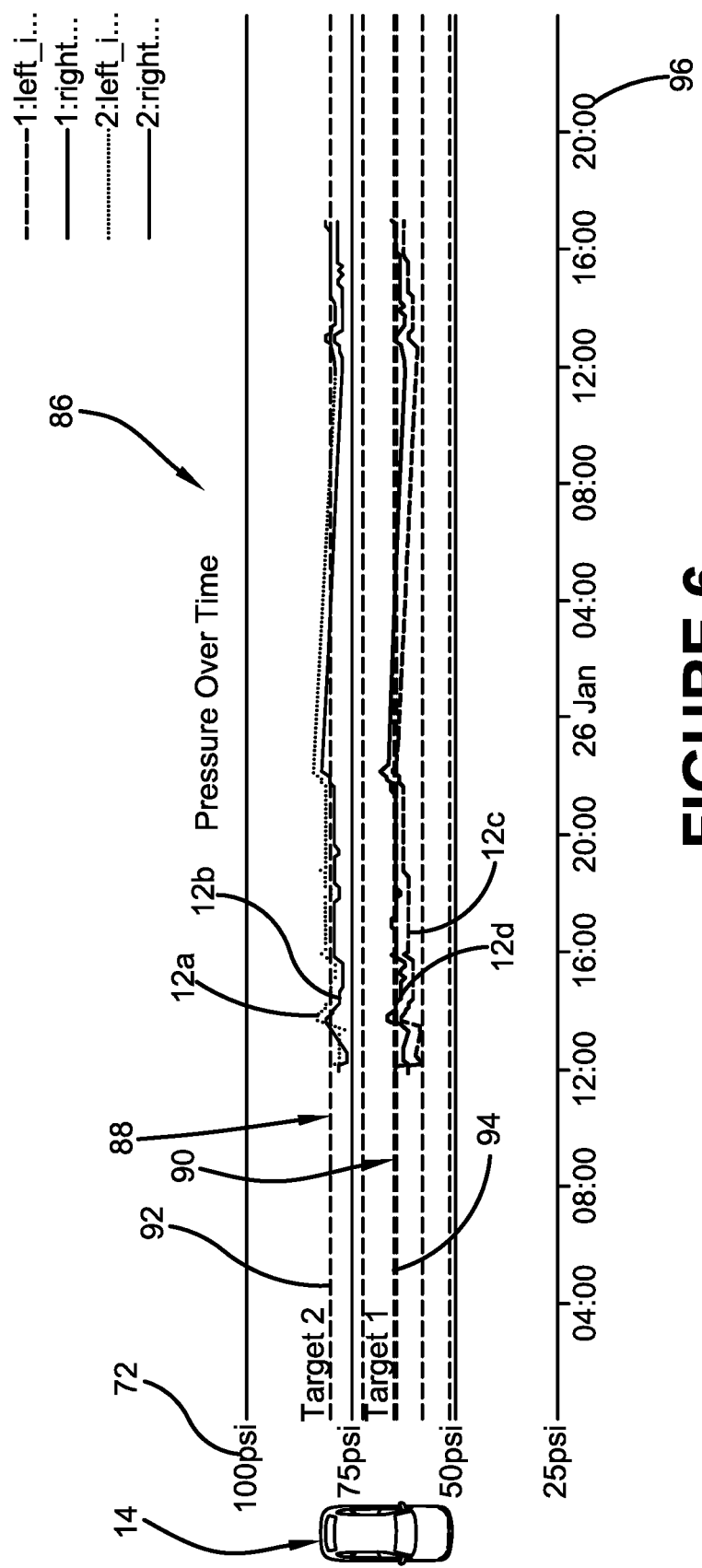
FIG. 6 is a graphical representation of an aspect of the tire pressure monitoring system shown in FIG. 4.

Turning to FIG. 4, the tire pressure monitoring system 10 includes a tire pressure model 54, which receives tire data 56. The tire data 56 includes the above-described measured tire pressure, measurement time and ID information for each tire 12. The tire pressure model 54 includes an aggregator 58. With additional reference to FIG. 5, the vehicle 14 includes multiple tires 12a, 12b, 12c, and 12d, and each tire is preferably equipped with a respective TPMS sensor 30 that generates tire data 56, including measured pressure data 60. The aggregator 58 accumulates the measured pressure data 60 from all of the TPMS sensors 30.

Returning to FIG. 4, the tire pressure model 54 employs a recommended pressure level or target pressure level 64 and inflation threshold levels 66 for each 12. The target pressure level 64 and the inflation threshold levels 66 are set by a manufacturer, a service technician, and/or a user, and preferably are stored in an electronic storage means 68, such as a data buffer, which is in electronic communication with the processor 48.

The tire pressure model 54 filters sensor noise from the measured pressure data 60 with a noise filter 70. More particularly, there may be unwanted variations, known as noise, in the data signal transmitted by the TPMS sensor 30. To improve the accuracy of the tire pressure data, and specifically the measured pressure data 60, the variations or noise are filtered out of the data using the noise filter 70, which preferably includes a linear quadratic estimation or a Kalman filter. The noise filter 70 processes the measured pressure data 60 using the Kalman filter and generates filtered pressure data 72.

The filtered pressure data 72 may optionally be stored in an electronic storage means 74, such as a data buffer, which is in electronic communication with the processor 48. The storage means 74 enables the filtered pressure data 72 to be stored and aggregated for analysis by a detection module 76.

The detection module 76 analyzes the filtered pressure data 72 for data indicative of inflation or deflation of each tire 12. More particularly, the detection module 76 preferably includes a comparator 78, which analyzes the filtered pressure data 72. The comparator 78 detects an inflation 80 of the tire 12 by comparing neighboring filtered pressure data values 72 to find groups of local maxima. When such groups are located, inflation 80 is detected, and the tire pressure model 54 generates an inflation notification 84.

The detection module 76 also includes a leak detection module 86, which determines whether a specific tire 12 has an air leak using only tire pressure measurements, and particularly, the filtered pressure data 72. With additional reference to FIG. 6, the leak detection module 86 monitors the pressure difference across two tires 12, which preferably are mounted on opposite ends of the same axle.

More particularly, the vehicle 14 includes a front axle 88, with the left front tire 12a and the right front tire 12b being mounted on each respective end of the front axle. The vehicle 14 also includes a rear axle 90, with the left rear tire 12c and the right rear tire 12d being mounted on each respective end of the rear axle. The tires 12a and 12b on the front axle 88 have a predetermined target pressure 92. The tires 12c and 12d on the rear axle 90 have a predetermined target pressure 94, which may be different from the predetermined target pressure 92 for the tires 12a and 12b on the front axle 88. Plotting the filtered pressure 72 for each tire 12a, 12b, 12c, and 12d over time 96 shows that, despite temperature-induced fluctuations in each tire during vehicle operation, tires mounted on the same axle 88 and 90 exhibit the same trend of pressure over time.

Figure 7:
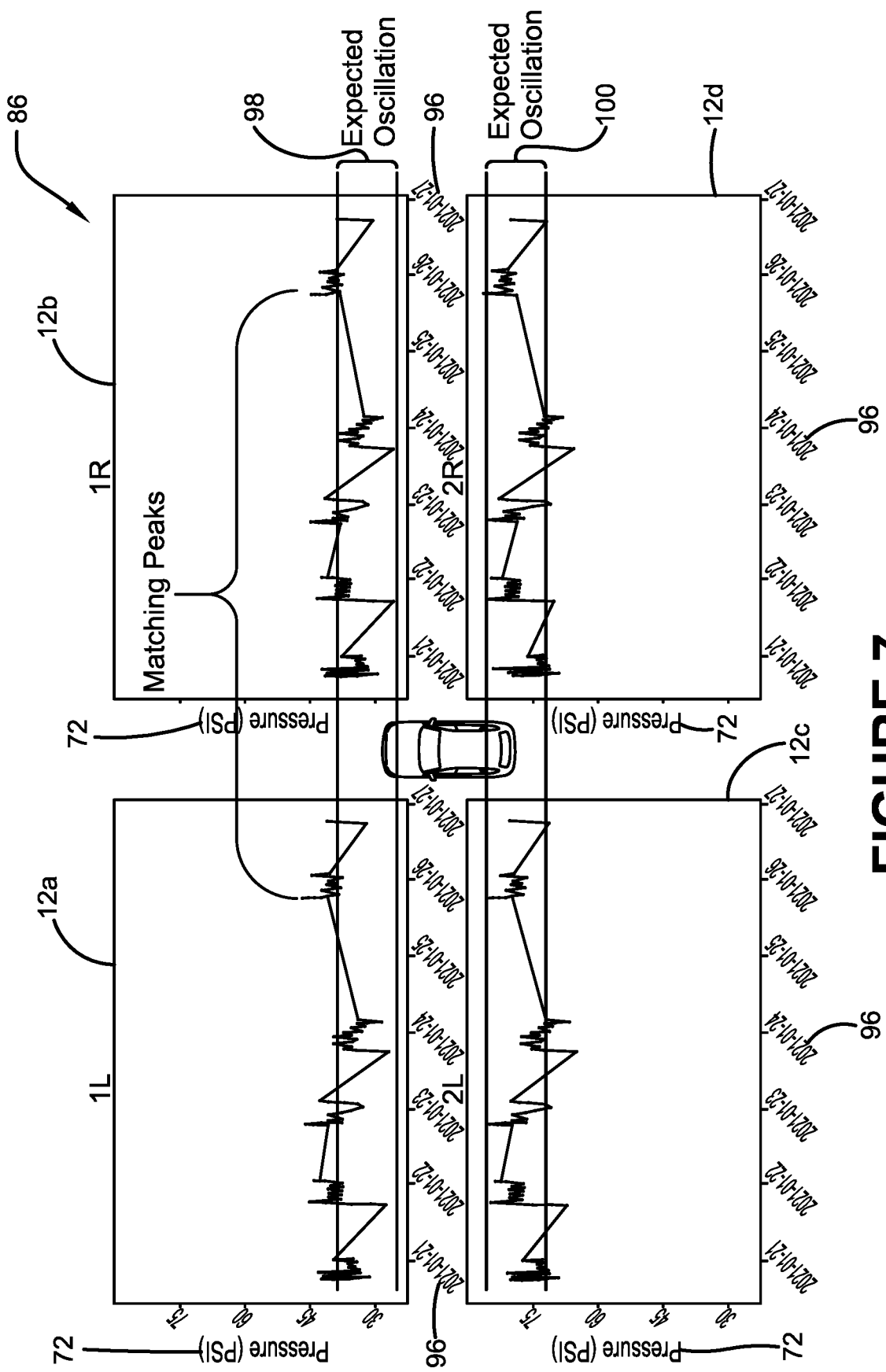
FIG. 7 is a graphical representation of an aspect of the tire pressure monitoring system shown in FIG. 4.

Turning to FIG. 7, the tires 12a and 12b on the front axle 88 follow the same pressure trend level with respect to one another, and the filtered pressure 72 over time 96 remains within a constant oscillation range 98. The tires 12c and 12d on the rear axle 90 also follow the same pressure trend level with respect to one another, so that the pressure 72 over time 96 remains within a constant oscillation range 100. In this manner, the left front tire 12a and the right front tire 12a on the front axle 88 follow the same pressure trend and the pressure level peaks are aligned. Likewise, the left rear tire 12c and the right rear tire 12d on the rear axle 90 follow the same pressure trend and the pressure level peaks are aligned. When there is no air loss, the accumulated differences in pressure 72 over time 96 for the tires 12a and 12b on the front axle 88 and for the tires 12c and 12d on the rear axle 90 remain constant.

Figure 8:
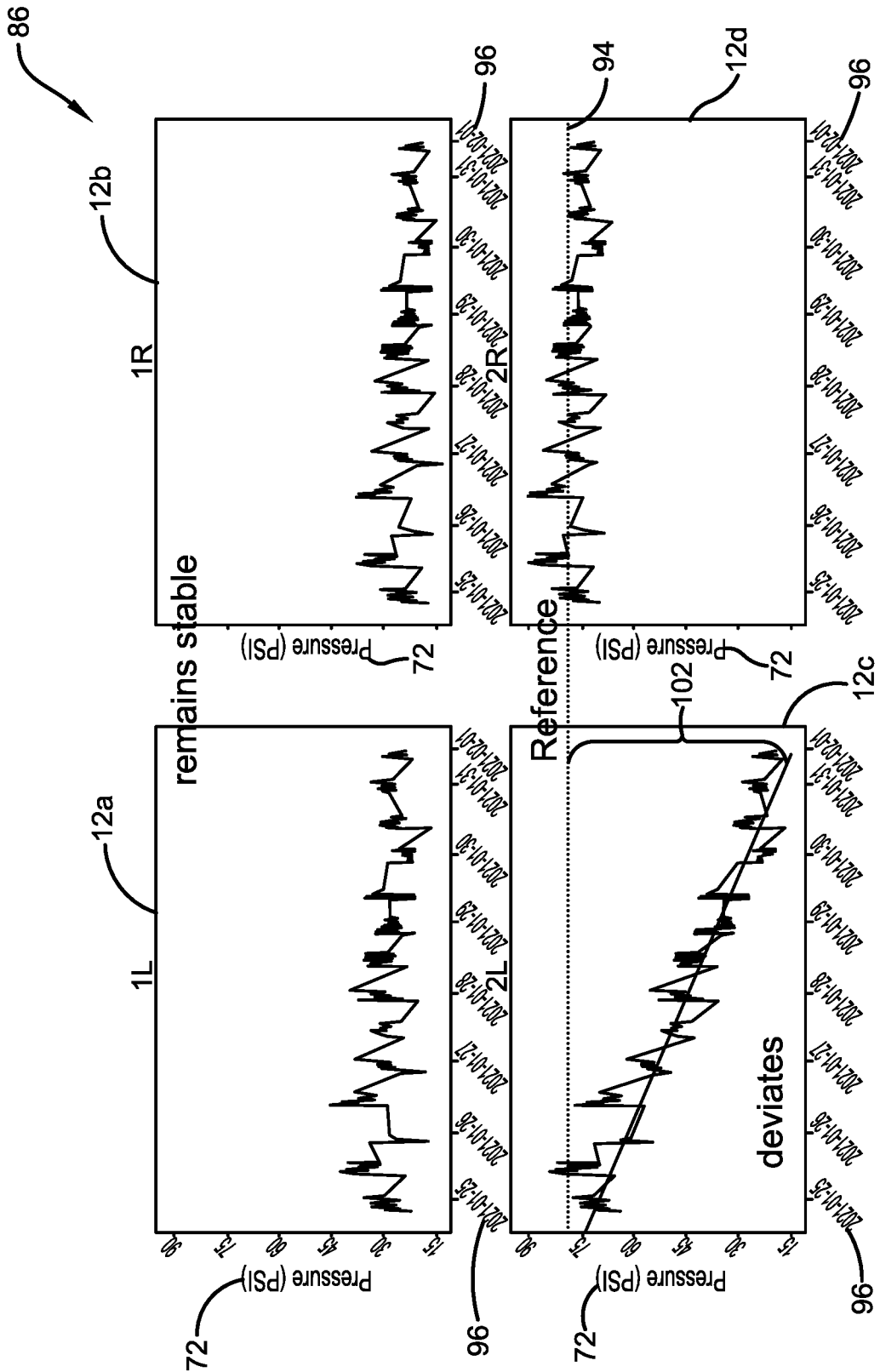
FIG. 8 is a graphical representation of an aspect of the tire pressure monitoring system shown in FIG. 4.

Referring to FIG. 8 by way of example, the tires 12a and 12b on the front axle 88 follow the same pressure trend, indicating no pressure leak in these tires. However, the tires 12c and 12d on the rear axle 90 do not follow the same pressure trend, indicating a pressure leak in one of the tires. Upon review of the trend of the filtered pressure 72, the left rear tire 12c deviates from the target pressure level 94, showing that the leak is in the left rear tire. When the leak detection module 86 detects a deviation in the filtered pressure 72 from the target pressure 94, the leak detection module determines a difference 102 between the filtered pressure and the target pressure.

The difference 102 may be calculated as a percentage between the filtered pressure 72 and the target pressure 94, which is a percentage of volume loss of the tire 12c. With additional reference to FIG. 4, when the difference 102 exceeds a predetermined threshold, such as about eight percent (8%), the detection module 76 actuates a leak notification 104 from the tire pressure module 54. Of course, the difference 102 may be calculated as a set pressure amount, as a variable pressure amount, or other amount known to those skilled in the art.

Figure 9:
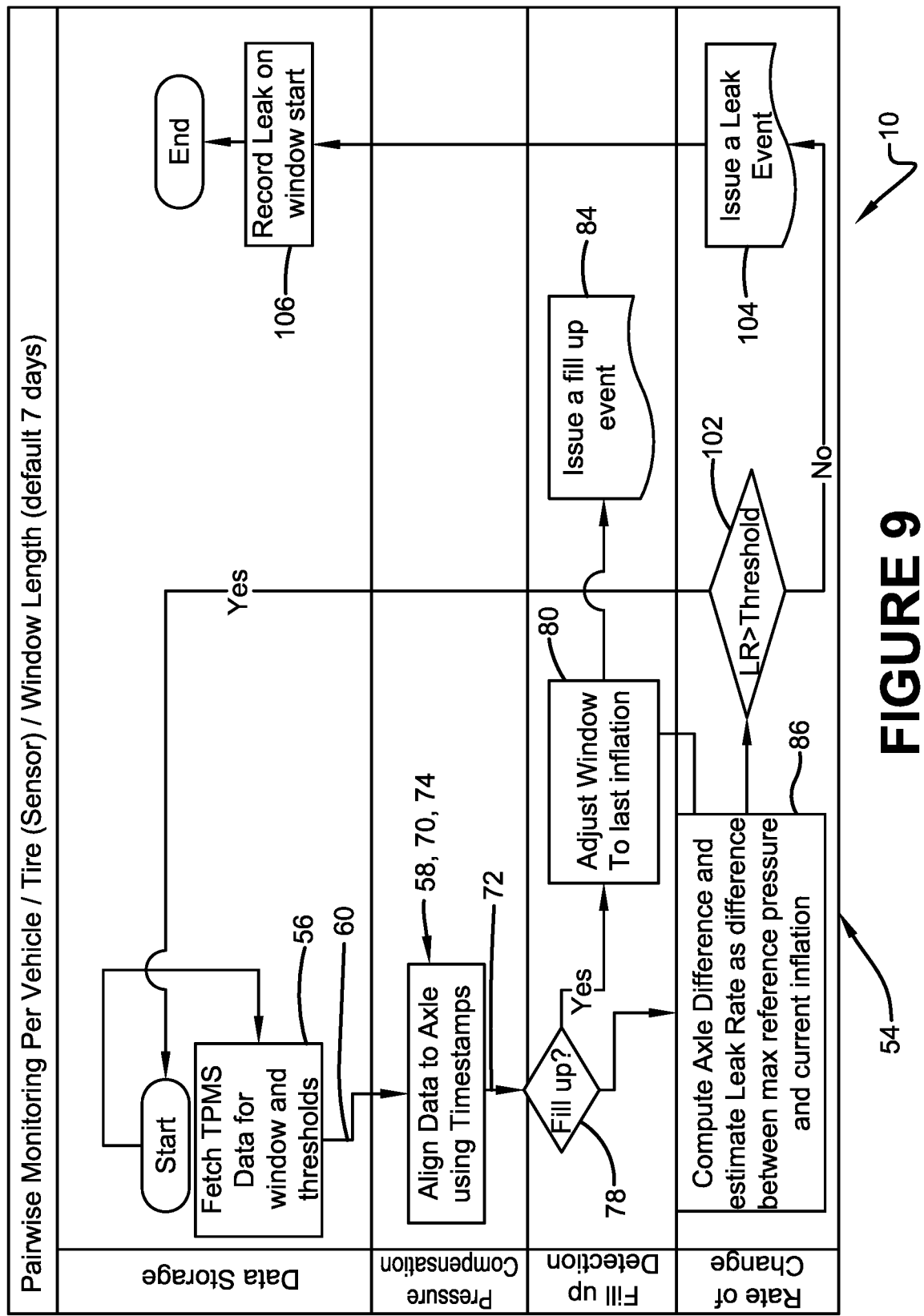
FIG. 9 is a flow diagram of aspects of a tire pressure model of tire pressure monitoring system shown in FIG. 4.

Additional aspects of the tire pressure model 54 are shown in FIG. 9. The tire pressure model 54 receives tire data 56, including measured pressure data 60. The aggregator 58 accumulates the measured pressure data 60 from all of the TPMS sensors 30. Variations or noise are filtered out of the measured pressure data 60 with the noise filter 70, which generates filtered pressure data 72. The filtered pressure data 72 may be stored in a data buffer 74, which enables the data to be aggregated for analysis. The comparator 78 analyzes the filtered pressure data 72, and detects inflation 80 when groups of local maxima are located, causing the tire pressure model 54 to generate an inflation notification 84.

The leak detection module 86 monitors the pressure difference across two tires 12, which preferably are mounted on opposite ends of the same axle, to determine whether a specific tire has an air pressure leak using only tire pressure measurements. When the leak detection module 86 detects a deviation in the filtered pressure 72 from the target pressure 94, the module determines a difference 102 between the filtered pressure 72 and the target pressure 94, and when the difference exceeds a predetermined threshold, the tire pressure model 54 generates the leak notification 104. Preferably, when the leak notification 104 is generated, the tire pressure model 54 stores the time of the leak notification on a storage medium 106 that is in electronic communication with the processor 48, such as a data buffer, for later analysis.

The tire pressure monitoring system 10 may determine the rate of the leak and generate a specific notification based on the rate of the leak. Determination of the leak rate and generation of a notice corresponding to the leak rate is described in detail in Application Ser. No. 63/070,862, which is owned by the same Assignee as the instant application, The Goodyear Tire & Rubber Company, and is incorporated by reference herein in its entirety.

Returning to FIGS. 3 and 4, the tire pressure model 54 generates an inflation notification 84 when inflation 80 is detected. When an air pressure leak in the tire 12 is detected, the tire pressure model 54 generates a leak notification 104. When a notification 84 or 104 is generated, the tire pressure monitoring system 10 preferably wirelessly transmits 46 the notification from the cloud-based server 44 to the display device 50, which is accessible to a user of the vehicle 14 or to a fleet manager.

Display of the notifications 84 and 104 enables a fleet manager viewing the display device 50 to take preventative measures, such as instructing a vehicle operator to slow the vehicle 14 down, direct the vehicle to a service center, and/or schedule the vehicle for maintenance. Display of the notifications 84 and 104 on the display device 50 may also enable a user viewing the display device to take action based on the notification.

In this manner, the tire pressure monitoring system 10 determines with precision if an air pressure leak is present when tire pressure is the only parameter that can be measured. The tire pressure monitoring system 10 monitors the pressure difference across two tires 12, which preferably are mounted on opposite ends of the same axle, and accumulates the pressure differences over time. If the accumulated difference exceeds a predetermined threshold, the system 10 generates an alert that a pressure leak is present, enabling a fleet manager or a vehicle user to take appropriate action.

The present invention also includes a method of monitoring tire pressure. The method includes steps in accordance with the description that is presented above and shown in FIGS. 1 through 9.

It is to be understood that the structure of the above-described tire pressure monitoring system may be altered or rearranged, or components or steps known to those skilled in the art omitted or added, without affecting the overall concept or operation of the invention.

The invention has been described with reference to a preferred embodiment. Potential modifications and alterations will occur to others upon a reading and understanding of this description. It is to be understood that all such modifications and alterations are included in the scope of the invention as set forth in the appended claims, or the equivalents thereof.

What is claimed is:

1. A tire pressure monitoring system comprising:
   a first tire mounted on a first end of an axle and a second tire mounted on a second end of the axle, wherein the first and second tires and the axle support a vehicle;
   a first sensor mounted on the first tire for measuring a pressure of the first tire;
   a second sensor mounted on the second tire for measuring a pressure of the second tire;
   means for transmitting measured pressure data from the first sensor and the second sensor to a processor; and
   a tire pressure model being executed on the processor, the tire pressure model including:
   an aggregator that accumulates the measured pressure data from the first sensor and the second sensor;
   a noise filter that filters sensor noise from the measured tire pressure data and generates filtered pressure data;
   a detection module receiving the filtered pressure data and comparing a trend of the filtered pressure data for the first tire over a period of time to a trend of the filtered pressure data for the second tire over the period of time and defining a first oscillation range of the trend for the first tire and a second oscillation range of the trend for the second tire, wherein the detection module determines an occurrence of an air pressure leak when the trend of the filtered pressure data for the first tire does not match the trend of the filtered pressure data for the second tire and at least one of the first oscillation range and the second oscillation range is below a target pressure; and
   a leak notification generated by the tire pressure model when the air pressure leak occurs.

2. The tire pressure monitoring system of claim 1, wherein the system is free of temperature measurements for at least one of the first tire and the second tire.

3. The tire pressure monitoring system of claim 1, wherein the leak detection module compares the filtered pressure data for the first tire and the filtered pressure data for the second tire to the target pressure to detect a deviation from the target pressure and to identify in which of the first tire and the second tire the air pressure leak has occurred.

4. The tire pressure monitoring system of claim 3, wherein the leak detection module determines a difference between the filtered pressure data and the target pressure for the respective one of the first tire and the second tire in which the air pressure leak has occurred.

5. The tire pressure monitoring system of claim 4, wherein the difference is calculated as a percentage between the filtered pressure data and the target pressure for the respective one of the first tire and the second tire in which the air pressure leak has occurred.

6. The tire pressure monitoring system of claim 4, wherein when the difference exceeds a predetermined threshold, the tire pressure module generates the leak notification.

7. The tire pressure monitoring system of claim 1, further comprising storage means in electronic communication with the processor for storing at least one of a target pressure level and an inflation threshold level for each tire.

8. The tire pressure monitoring system of claim 1, further comprising storage means in electronic communication with the processor for storing a time of the leak notification.

9. The tire pressure monitoring system of claim 1, further comprising storage means in electronic communication with the processor for storing and aggregating the filtered pressure data.

10. The tire pressure monitoring system of claim 1, further comprising an electronic memory capacity in each of the first sensor and the second sensor, or in a first unit mounted on the first tire and in a second unit mounted in the second tire, wherein the electronic memory capacity stores tire identification information.

11. The tire pressure monitoring system of claim 10, further comprising means for transmitting the tire identification information to the processor, wherein the tire pressure model receives the tire identification information.

12. The tire pressure monitoring system of claim 1, wherein the noise filter includes a at least one of a linear quadratic estimation and a Kalman filter.

13. The tire pressure monitoring system of claim 1, wherein the detection module includes a comparator that detects an inflation of at least one of the first tire and the second tire.

14. The tire pressure monitoring system of claim 13, wherein the inflation of at least one of the first tire and the second tire is determined by comparing neighboring filtered pressure data values to find local maxima.

15. The tire pressure monitoring system of claim 13, further comprising an inflation notification generated by the tire pressure model when the detection module detects inflation of at least one of the first tire and the second tire.

16. The tire pressure monitoring system of claim 1, wherein the processor includes a vehicle-mounted processor.

17. The tire pressure monitoring system of claim 1, wherein the processor includes a remote processor.

18. The tire pressure monitoring system of claim 17, wherein the remote processor is in a cloud-based server.

19. The tire pressure monitoring system of claim 1, wherein the tire pressure monitoring system transmits the notification to a display device that is accessible to at least one of a user of the vehicle and a fleet manager.

* * * * *